(12) United States Patent
Sloane et al.

(10) Patent No.: US 10,810,006 B2
(45) Date of Patent: *Oct. 20, 2020

(54) INDICATOR REGRESSION AND MODELING FOR IMPLEMENTING SYSTEM CHANGES TO IMPROVE CONTROL EFFECTIVENESS

(71) Applicant: Bank of America Corporation, Charlotte, NC (US)

(72) Inventors: Brandon Sloane, Santa Barbara, CA (US); John Brian Costello, Long Beach, CA (US); Brian Diederich, Simi Valley, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 531 days.

This patent is subject to a terminal disclaimer.

(21) Appl. No.: 15/688,253

(22) Filed: Aug. 28, 2017

(65) Prior Publication Data

US 2019/0065178 A1    Feb. 28, 2019

(51) Int. Cl.
*G06F 8/71* (2018.01)
*H04L 12/24* (2006.01)
*G06Q 10/04* (2012.01)

(52) U.S. Cl.
CPC .............. *G06F 8/71* (2013.01); *G06Q 10/04* (2013.01); *H04L 41/0893* (2013.01)

(58) Field of Classification Search
CPC ....... G06F 8/71; G06Q 10/04; H04L 41/0893; G05B 13/042
USPC ........................................................ 703/2
See application file for complete search history.

(56) References Cited

U.S. PATENT DOCUMENTS

| | | |
|---|---|---|
| 7,415,728 B2 | 8/2008 | Morohashi et al. |
| 7,552,480 B1 | 6/2009 | Voss |
| 7,681,234 B2 | 3/2010 | Florencio et al. |
| 7,865,952 B1 | 1/2011 | Hopwood et al. |
| 8,121,892 B2 | 2/2012 | Baggett, Jr. et al. |

(Continued)

OTHER PUBLICATIONS

Kevin Dowd, "An introduction to market risk measurement", ISBN 0470847484, 2002.

(Continued)

*Primary Examiner* — Justin C Mikowski
(74) *Attorney, Agent, or Firm* — Michael A. Springs; Moore & Van Allen PLLC; James C. Edwards

(57) ABSTRACT

Embodiments of the present invention provide a system for indicator regression and modeling for implementing system changes to improve control effectiveness. The system is typically configured for presenting, prompting for and receiving a selection from a list of controls from a user, via a control effectiveness application user interface on a user device. The system is also for receiving two or more consideration indicators from the user device, via the control effectiveness application user interface forming a consideration set; applying a regression algorithm on the consideration set of indicators; reducing a number of the subset of the consideration set of indicators based on a threshold correlation or a threshold number; finalizing the final equation with the number of the subset, each having a corresponding coefficient; and, in response to finalizing the final equation, automatically performing an action configured to improve effectiveness of the control based on the final equation.

18 Claims, 4 Drawing Sheets

(56) References Cited

U.S. PATENT DOCUMENTS

| | | | |
|---|---|---|---|
| 8,170,841 B2* | 5/2012 | Pinto | G06Q 10/04 |
| | | | 700/44 |
| 8,196,207 B2 | 6/2012 | Hill et al. | |
| 8,201,257 B1 | 6/2012 | Andres et al. | |
| 8,225,371 B2 | 7/2012 | Jones et al. | |
| 8,256,004 B1 | 8/2012 | Hill et al. | |
| 8,260,653 B1 | 9/2012 | Osterfelt et al. | |
| 8,478,788 B1 | 7/2013 | Frazier et al. | |
| 8,495,367 B2 | 7/2013 | Ben-Natan | |
| 8,495,747 B1 | 7/2013 | Nakawatase et al. | |
| 8,549,649 B2 | 10/2013 | Golomb et al. | |
| 8,594,982 B2 | 11/2013 | Mott et al. | |
| 8,595,845 B2 | 11/2013 | Basavapatna et al. | |
| 8,744,894 B2 | 6/2014 | Christiansen et al. | |
| 8,782,784 B1 | 7/2014 | Bruskin | |
| 8,813,176 B2 | 8/2014 | Jones et al. | |
| 8,831,677 B2 | 9/2014 | Villa-Real | |
| 8,918,867 B1 | 12/2014 | Salour | |
| 9,130,983 B2 | 9/2015 | Heo et al. | |
| 9,571,517 B2 | 2/2017 | Vallone et al. | |
| 9,628,501 B2 | 4/2017 | Datta Ray et al. | |
| 9,804,752 B1 | 10/2017 | Mall | |
| 10,187,408 B1 | 1/2019 | Call et al. | |
| 10,410,142 B1* | 9/2019 | Hess | G06Q 10/00 |
| 10,565,329 B2* | 2/2020 | Greenwood | G16H 50/50 |
| 2004/0205709 A1 | 10/2004 | Hiltgen et al. | |
| 2006/0224486 A1 | 10/2006 | Krull et al. | |
| 2006/0265630 A1 | 11/2006 | Alberti et al. | |
| 2006/0294430 A1 | 12/2006 | Bunker et al. | |
| 2007/0067678 A1* | 3/2007 | Hosek | G05B 23/0235 |
| | | | 714/25 |
| 2008/0263534 A1 | 10/2008 | Hirsave et al. | |
| 2008/0295114 A1* | 11/2008 | Argade | G06F 9/485 |
| | | | 719/320 |
| 2011/0154498 A1 | 6/2011 | Fissel et al. | |
| 2011/0178836 A1 | 7/2011 | Seefeld et al. | |
| 2012/0004946 A1* | 1/2012 | Blackwood | G06Q 10/06 |
| | | | 705/7.28 |
| 2012/0030312 A1 | 2/2012 | Lehr et al. | |
| 2015/0066577 A1 | 3/2015 | Christiansen et al. | |
| 2015/0163242 A1* | 6/2015 | Laidlaw | G06F 21/552 |
| | | | 726/22 |
| 2015/0178063 A1 | 6/2015 | Narkinsky et al. | |
| 2015/0227868 A1 | 8/2015 | Saraf et al. | |
| 2016/0050181 A1 | 2/2016 | Halpern et al. | |
| 2016/0117211 A1 | 4/2016 | Makuch et al. | |
| 2018/0081330 A1* | 3/2018 | Haslett | G05B 13/027 |

OTHER PUBLICATIONS http://iwar.org.uk/comsec/resources/iso-27001/measuring-effectiveness.pdf—retrieved on Jan. 22, 2018.
http://eval.symantec.com/mktginfo/downloads/21187913_GA_WP_SecuringtheCloudfortheEnterprise_05%2011.pdf—retrieved on Jan. 22, 2018.
http://media.kaspersky.com/en/business-security/growth-and-complexity-of-information-security.pdf—retrieved on Jan. 22, 2018.
https://statetechmagazine.com/sites/default/files/continuous_monitoring_of_information_security.pdf—retrieved on Jan. 22, 2018.

* cited by examiner

INDICATOR REGRESSION AND MODELING FOR IMPLEMENTING SYSTEM CHANGES TO IMPROVE CONTROL EFFECTIVENESS

FIELD

The present invention relates to improving control effectiveness and, more specifically, relates to implementing system changes in response to indicator regression and modeling to improve control effectiveness.

BACKGROUND

Present conventional systems predict one or more events by using rudimentary modeling techniques based on the quantitative analysis of past events. That said, there are a number of technical problems with using the conventional systems to analyze controls. As such, there exists a need for an improved way of improving control effectiveness.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the present invention address the above needs and/or achieve other advantages by providing apparatuses (e.g., a system, computer program product and/or other devices) and methods for improving control effectiveness by indicator regression and modeling for implementing system changes. The system embodiments may comprise one or more memory devices having computer readable program code stored thereon, a communication device, and one or more processing devices operatively coupled to the one or more memory devices.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
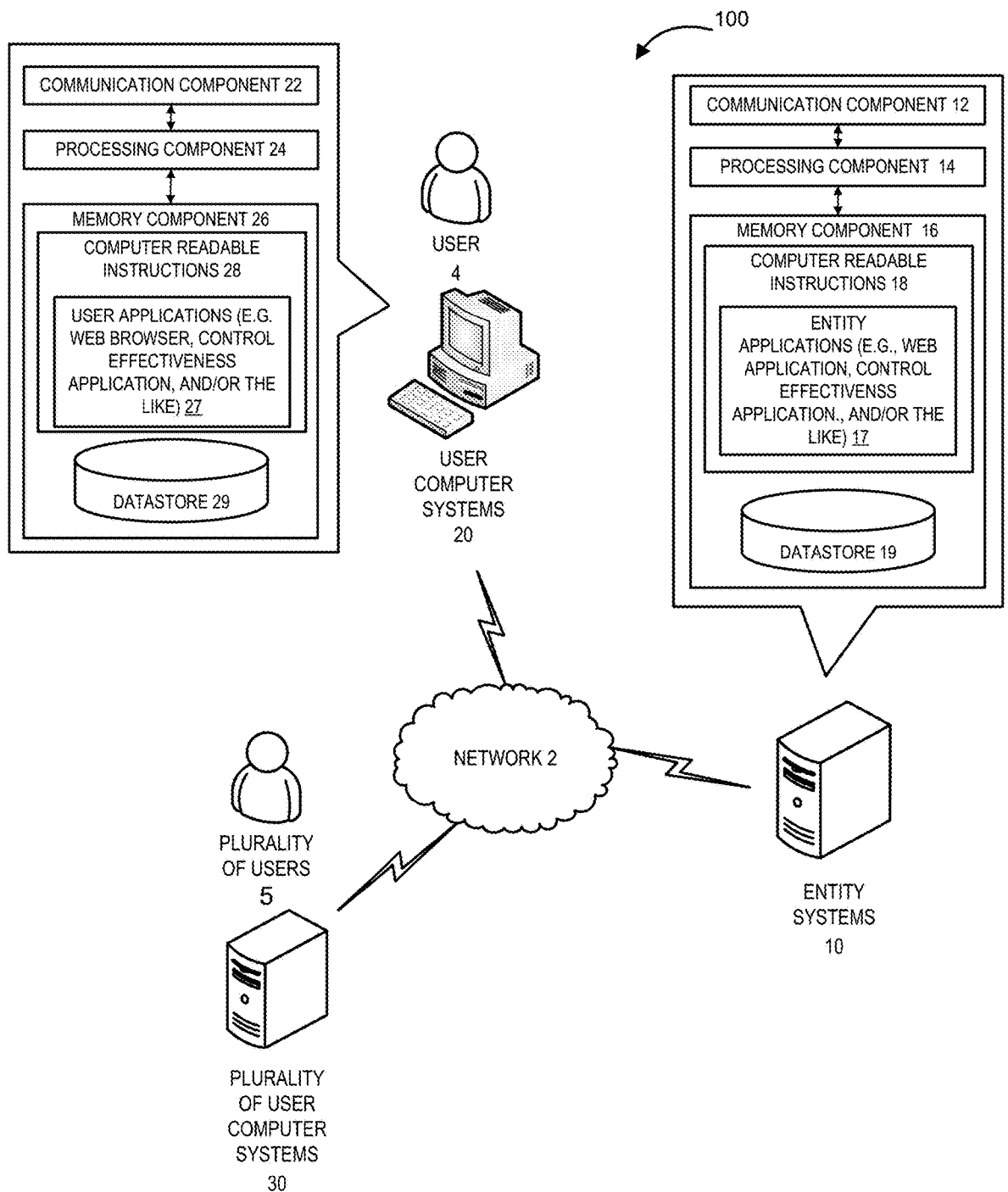

Having thus described embodiments of the invention in general terms, reference will now be made to the accompanying drawings, where:

FIG. 1 illustrates a block diagram illustrating the control effectiveness improvement system environment, in accordance with embodiments of the present invention.

Figure 2A:
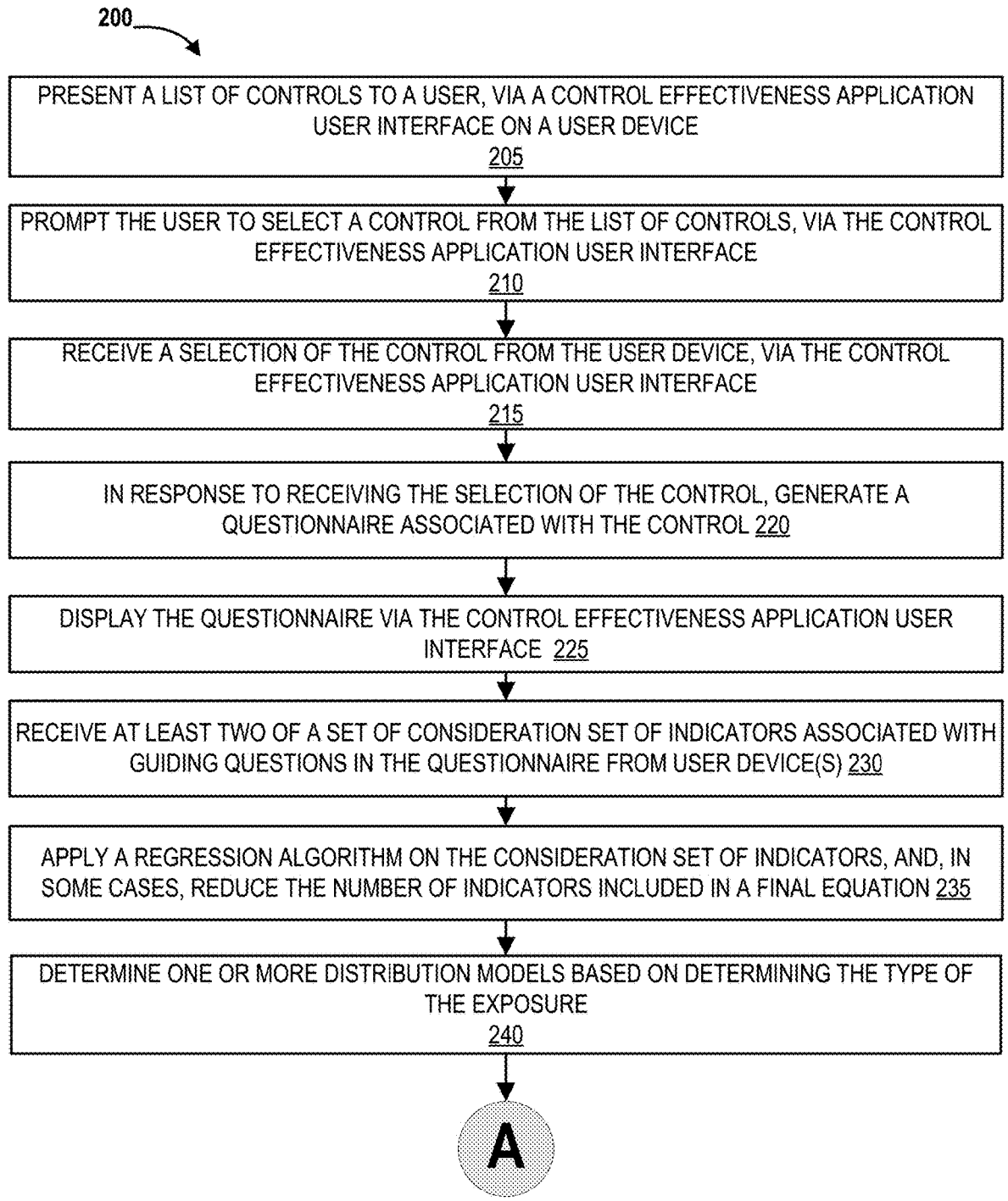

FIG. 2A is a flowchart illustrating a general process flow for improving control effectiveness by indicator regression and modeling for implementing system changes, in accordance with embodiments of the present invention.

Figure 2B:
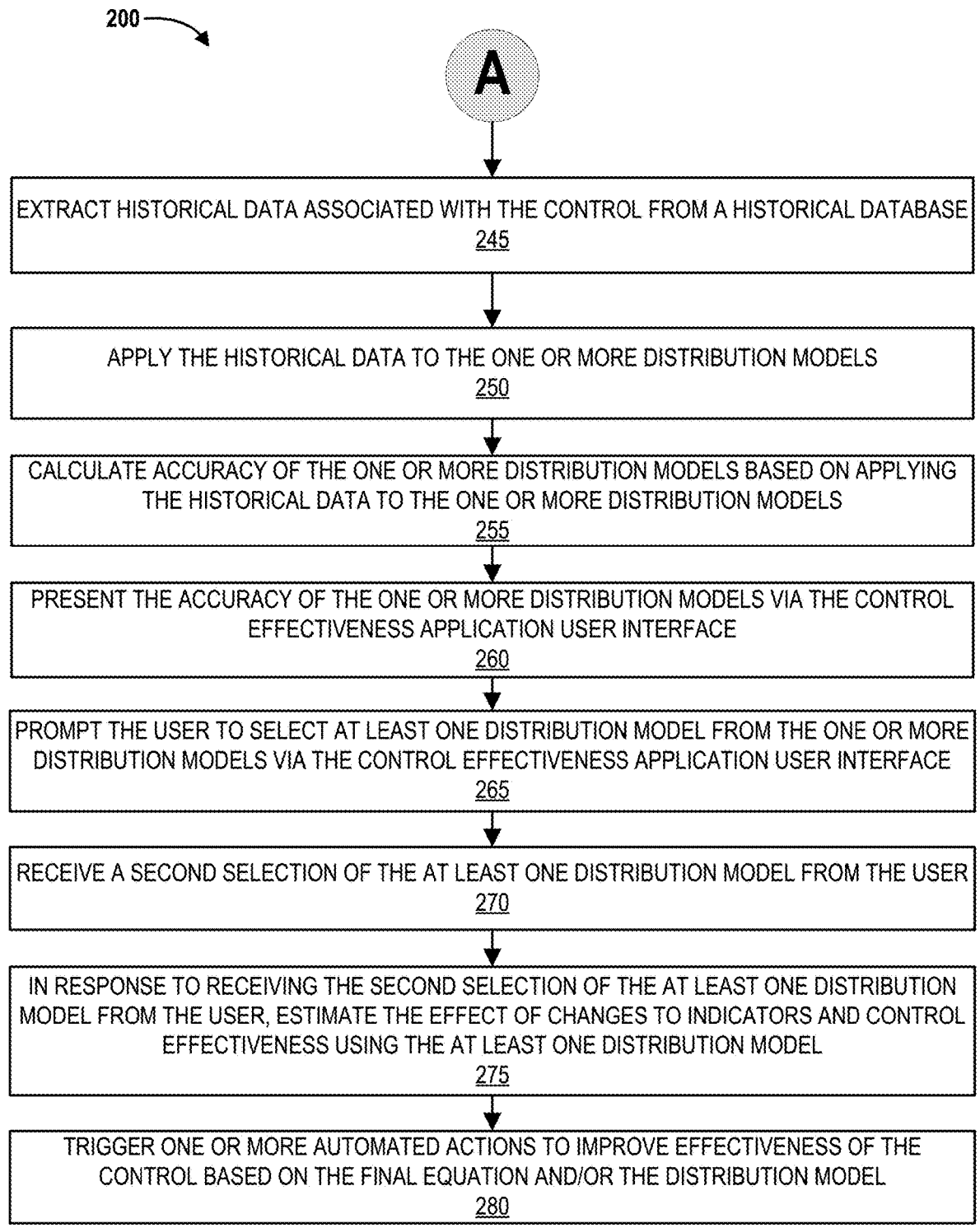

FIG. 2B is a flowchart illustrating a continuation of the general process flow for improving control effectiveness by indicator regression and modeling for implementing system changes, in accordance with embodiments of the present invention.

Figure 3:
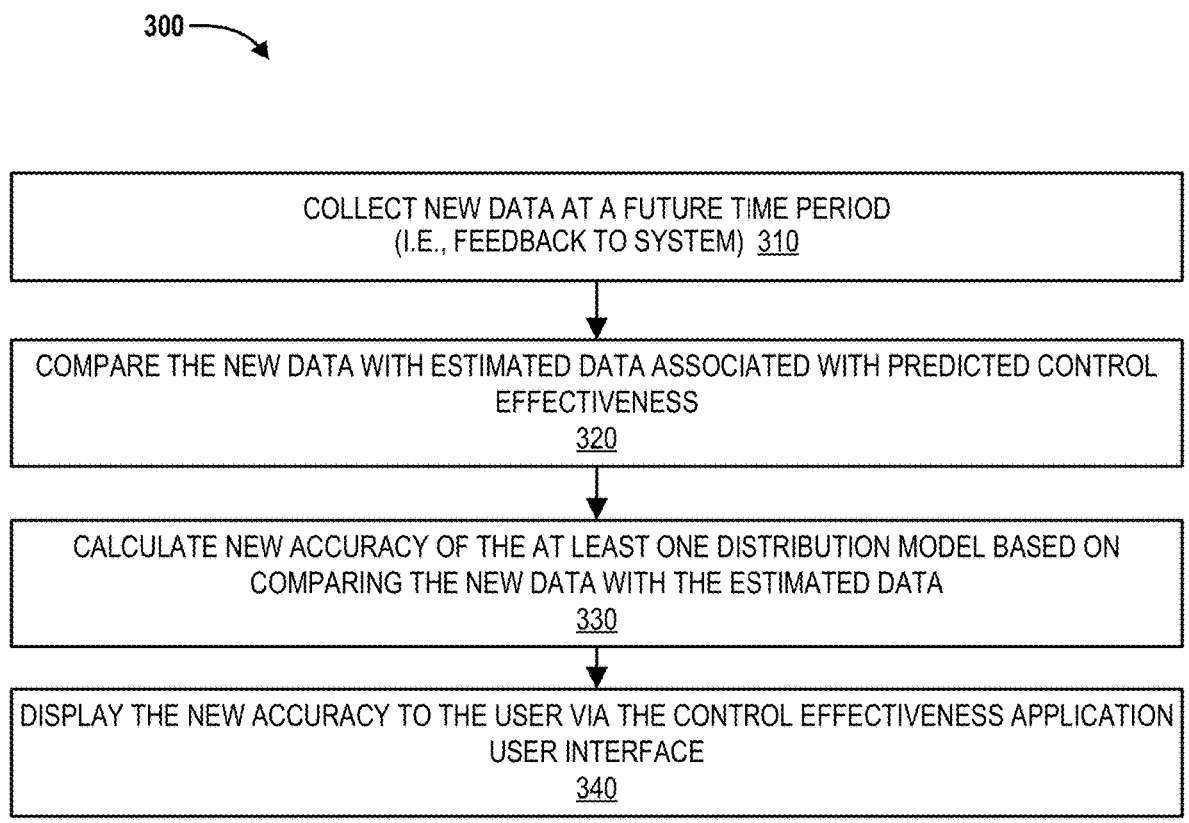

FIG. 3 is a flowchart illustrating a general process flow for verifying accuracy of a distribution model selected by the user at a future time period, in accordance with embodiments of the present invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed that provide for improving control effectiveness by indicator regression and modeling for implementing system changes. Typically, conventional systems use distribution models that are rudimentary to perform exposure analysis and predict the one or more events. The rudimentary distribution models utilized by the systems may be normal Gaussian distribution models that rely on quantitative analysis of historical data to predict the one or more events. For example, the conventional systems may determine that certain types of events are occurring frequently and may give highest priority to the frequently occurring events neglecting the impact of the non-frequently occurring events. Events which occur less frequently may have highest impact on the system. Assigning highest priority to the low impact events may cause the systems to take corrective measures and allocate resources to the low impact events, thereby neglecting the high impact events. The high impact events may disrupt the entire system and also degrade the performance of the systems. The present invention solves the problem by performing regression analysis of indicators to determine those indicators most indicative of control effectiveness and to then suggest one or more distribution models suitable for the control, thereby increasing processing efficiency of the systems and also enabling proper allocation of resources to implement system changes intended to improve the controls.

Embodiments of the invention provide a system for indicator regression and modeling for implementing system changes to improve control effectiveness. The system is typically configured for presenting a list of controls to a user, via a control effectiveness application user interface on a user device; prompting the user to select a control from the list of controls, via the control effectiveness application user interface; receiving a selection of the control from the user device, via the control effectiveness application user interface; receiving two or more consideration indicators from the user device, via the control effectiveness application user interface, wherein the two or more consideration indicators form a consideration set of indicators; applying a regression algorithm on the consideration set of indicators; determining threshold correlation or threshold number of indicators for inclusion in a final equation relating a subset of the consideration set of indicators with control effectiveness of the control; reducing a number of the subset of the consideration set of indicators based on the threshold correlation or threshold number; finalizing the final equation with the number of the subset, each having a corresponding coefficient; and, in response to finalizing the final equation, automatically performing an action configured to improve effectiveness of the control based on the final equation.

A "control" refers to a type of capability that has a desired exposure mitigation result. For example, antivirus software implemented in an environment or system is a control often applied to end point computing resources to mitigate the exposure of viral infections to those systems. Traditionally, determining the effectiveness of controls, while extremely important to efficient functioning of an environment, has proven very difficult. Some common frameworks exist for evaluating maturity of controls but they are very general (i.e., typically not specific to any particular control). Such solutions may not truly enable the user to determine control effectiveness. Information security professionals are usually forced to manually review sources such as historical event data to determine if a process or system is worked as intended. While such a manual procedure may indicate a change in behavior of a control, environment or system, it does not necessarily provide a quantifiable means by which to evaluate the effectiveness of the control itself.

Therefore, embodiments of the present invention enable, for a particular information security control, following a predefined framework of categories to determine a possible consideration set of independent variables. Such consideration set may be correlated with control effectiveness. Using the antivirus control as an example, an environmental variable that may be included in the consideration set is the complexity of the desktop environment within the enterprise (i.e., within the end points or systems under consideration by the control). If there are numerous operating systems (e.g., Operating System A, Operating System B, Operating System C and Operating System D) running the end points of an environment, then a higher complexity score may be assigned. Alternatively, if there is only a single operating system running on all the various end points and systems of an environment under consideration, then a lower complexity score may be assigned.

The consideration set of indicators (i.e., variables) may be compiled by contextual knowledge of circumstances of a situation. For example, the consideration set may be compiled by a team of associates who work closely with the environment and may have anecdotal, experiential or other indications or beliefs that particular variables may affect control effectiveness. In some instances, actual historical correlation between indicators and control effectiveness may be used to populate the consideration set of indicators and may be used in conjunction with less strict methods for populating the consideration set such as contextual considerations as noted above.

When applying the regression algorithm, a P-value, confidence level, degree of accuracy or other metrics may be used to assist in determining a cutoff, that is, when the appropriate number of the consideration set have been identified to retain in the final equation related to control effectiveness.

In various embodiments, the system of the invention learns by every iteration of the process to become better at predicting variables, measures and having better indications of which indicators should be retained and which should be removed from the final equation (threshold of correlation). This may be done by the system receiving feedback from the output such as the actual effectiveness of modification of particular variables on the control effectiveness.

In various embodiments, different actions may be triggered by the development of the final equation relating the correlated indicators of the consideration set to the control effectiveness. For example, this may lead to the administrator or leader of a line of business to make certain business decisions, but also may lead the system to automatically take corrective action. Such results may feed a pipeline for planning, such as if performing action A is not going to have as significant an effect as taking action B, then the regression may be re-run after having made the assumption that action A has been performed. After such a re-running of the regression, then the equation may have changed drastically and action B is no longer even indicative of control effectiveness. It may be learned that action C is more indicative of control effectiveness at such a stage. Some or all of these process steps may be performed automatically so that action A is implemented in the system, and once implemented, it is already known, that in order to improve the effectiveness of the control further, that action C is the best variable to take action. The system may take such action or determine that the control effectiveness is sufficient.

Once a full consideration set of indicators has been assembled, then they are parameterized using a normalized scale. Then, they are regressed against historical control effectiveness data. Parameterization refers to the act of transformation from a non-data driven scale to one that can be defined by specific data points (e.g., the number of systems running a particular operating system in the example above). Normalization refers to a scaling of the variables to bring each of the set of consideration set indicators closer to one another so as to ensure greater meaning by the resulting regression coefficients. Various regression techniques may be used such as least squares regression, which may provide for ease in coefficient elimination (the next step).

After regression, it should be clear which consideration set indicators have high correlations to control efficiency and which ones do not. The next step is to remove those indicators that have lower correlations to control effectiveness. In some embodiments, a predetermined threshold of correlation may be set by the user in order to remove those indicators that have lower or no correlations to control effectiveness. This process may be repeated until there is a good approximation of the effectiveness as represented by a small subset of the consideration set indicators. The number of the subset of consideration set indicators may be predetermined, such as three (3) or five (5) or may be based on a level of comfort a user has with the number of variables provided the correlation of the variables to the control effectiveness as indicated by their corresponding coefficients.

The result of this process is a unique equation for each control with a unique subset of independent variables (indicators) that are strong indicators of the future effectiveness of that specific control. This enables the user to make informed decisions regarding how a control might change over time, what factors have the greatest impact on improving control effectiveness and where the user and/or system should implement changes to information security structure so as to maximize exposure mitigation strategies. For example, in some embodiments of the invention, the system automatically implements reduction of the number of operating systems running on the various end points within an environment once an equation indicating the number of operating systems indicator is deemed a "high" correlation to effectiveness of the antivirus control.

In summary, embodiments of the present invention enable improving control effectiveness by indicator regression and modeling for implementing system changes. Traditional systems are focused more on control maturity rather than specific control effectiveness, along with analyzing variables (indicators) that are non-traditionally utilized in reviewing controls. Such process enables the system to automatically implement information security changes that will improve control effectiveness.

In accordance with embodiments of the invention, the terms "entity system" may include any organization such as one that processes financial transactions including, but not limited to, banks, credit unions, savings and loan associations, card associations, settlement associations, investment companies, stock brokerages, asset management firms, insurance companies and the like. Furthermore, embodiments of the present invention use the term "user" or "customer." It will be appreciated by someone with ordinary skill in the art that the user or customer may be a customer of the financial institution or a potential customer of the financial institution or an employee of the financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, personal computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

FIG. 1 illustrates a control effectiveness system environment 100, in accordance with embodiments of the invention. As illustrated in FIG. 1, one or more entity systems 10 are operatively coupled, via a network 2, to user computer systems 20, a plurality of user computer systems, and/or one or more other systems (not illustrated). In this way, the user 4 (e.g., one or more associates, employees, agents, contractors, sub-contractors, third-party representatives, customers, or the like), through a user application 27 (e.g., web browser, dedicated and/or control effectiveness application, or the like), may access entity applications 17 (e.g., website, event prediction application, or the like) of the entity systems 10 to perform exposure mitigation by control effectiveness analysis as discussed herein. In some embodiments, the control effectiveness application may be a part of an independent control effectiveness system. In such an embodiment, the independent control effectiveness system is maintained and operated by the entity systems 10. The independent control effectiveness system may comprise one or more processing devices operatively coupled to the one or more memory devices and configured to execute computer readable code stored in the one or more memory devices.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the entity systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the user computer systems 20, the interaction entity systems 30, third-party systems 40, or other systems. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like. In one embodiment of the present invention, the one or more processing components 14 automatically implement one or more automated counter measures to mitigate impact of the one or more exposures. This may be done by development of equations modeling control effectiveness and implementation of system changes based thereon as discussed herein.

As further illustrated in FIG. 1, the entity systems 10 comprise computer-readable instructions 18 stored in the memory component 16, which in one embodiment includes the computer-readable instructions 18 of the entity application 17 (e.g., website application, control effectiveness application, and/or the like). In some embodiments, the one or more memory components 16 include one or more data stores 19 for storing data related to the entity systems 10, including, but not limited to, data created, accessed, and/or used by the entity application 17. The one or more data stores store historical data, information such as information security knowledge, industry specific knowledge associated with one or more historical exposures. In some embodiments, information associated with the one or more exposures is gathered by the entity applications 17 by communicating with other entity systems or third party entity systems (not shown). In one embodiment of the present invention, the control effectiveness application comprises an analytics engine to perform one or more steps described in the process flows 200 and 300.

As illustrated in FIG. 1, users 4 may access the application 17, or other applications, through a user computer system 20. The user computer system 20 may be a desktop, mobile device (e.g., laptop, smartphone device, PDA, tablet, or other mobile device), or any other type of computer that generally comprises one or more communication components 22, one or more processing components 24, and one or more memory components 26.

The one or more processing components 24 are operatively coupled to the one or more communication components 22 and the one or more memory components 26. The one or more processing components 24 use the one or more communication components 22 to communicate with the network 2 and other components on the network 2, such as, but not limited to, the user computer systems 20, a plurality of user computer systems 30, and/or other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4. In one embodiment of the present invention, the control effectiveness application in the user computer systems 20 and the plurality of user computer systems 30 may comprises a special control effectiveness interface to display information associated with the one or more controls, the process steps discussed herein and the automatic actions that may be taken in response to the control effectiveness processes discussed herein. Such information may be displayed to the user and the interface may receive information associated with the consideration set variables and/or the one or more historical exposures or otherwise from the user.

As illustrated in FIG. 1, the user computer systems 20 may have computer-readable instructions 28 stored in the one or more memory components 26, which in one embodiment includes the computer-readable instructions 28 for user applications 27, such as control effectiveness application (e.g., apps, applet, or the like), portions of control effectiveness application, a web browser or other apps that allow the user 4 to take various actions, including allowing the user 4 to access applications located on other systems, or the like. In some embodiments, the user 4 utilizes the user applications 27, through the user computer systems 20, to access the entity applications 17 to perform control effectiveness analysis. Moreover, in some embodiments the user 4 may also utilize the user applications 27 to implement one or more corrective measures to mitigate the impact of the one or more potential exposures resulting from control ineffectiveness (i.e., may implement system changes to improve control effectiveness, thereby preventing exposure). The plurality of user computer systems 30 associated with a plurality of user 5 may include similar structure as that of the user computer systems 20.

Referring now to FIG. 2, a general process flow 200 is provided for improving control effectiveness, in accordance with embodiments of the present invention. As shown in block 205, the system presents a list of controls to a user, via a control effectiveness application user interface on a user device. The list of controls may include data loss, technology failure, and/or the like. In some embodiments, the list of controls may be operational risks. In some embodiments, the list of controls may be identified and provided by the entity systems 10. In alternate embodiments, the list of controls may be identified by the system 30 based on past events.

As shown in block 210, the system prompts the user to select a control from the list of controls, via the event prediction application user interface. For example, the user may want to perform control effectiveness analysis and event prediction associated with data loss. The system may prompt the user to select one control from the list of controls that the user wishes to perform exposure analysis on. In block 215, the system receives selection of a control from the user device, via the control effectiveness application user interface. For example, the user may select antivirus from the list of controls and may submit the selection of antivirus to the system via the control effectiveness application user interface. In some embodiments, the user may select more than one control from the list of controls presented by the system via the user interface. In some embodiments, the user may select a single control and one or more sub categories of the single control. For example, the user may select antivirus and only antivirus on end point user systems from the sub-categories associated with the antivirus.

As shown in block 220, the system in response to receiving the selection of the control, generates a questionnaire associated with the control. The questionnaire may include one or more guiding questions that determine one or more indicators that may indicate control effectiveness. The questions are typically guiding questions and may comprise one or more options. In some embodiments, the system extracts industry specific knowledge from the one or more data stores to formulate the one or more guiding questions. For example, the system may extract information associated with the number of regulatory agencies involved with the data associated with the control and formulates guiding questions and may provide one or more options such as "extreme importance," "moderate importance," "low importance," and/or the like. In some embodiments, the system extracts information security knowledge from a data store to formulate the one or more guiding questions. For example, the system extracts information associated with the type of data, number of existing controls to regulate the flow of data, and the number of customers associated with the data and formulates guiding questions and may also provide one or more options such as "extreme importance," "moderate importance," "low importance," and/or the like.

In some embodiments, the one or more guiding questions are based on historical data. In an exemplary embodiment, the system may identify that one or more past events associated with the control selected by the user and may formulate guiding questions such as "There are 'n' number of past events associated with the control, do you believe those events are correlated with control effectiveness?" The system may also present more than one option to the user. Alternatively, the system may directly input the answer into a text box provided by the system. In some embodiments, after receiving the selection of control 'A' from the user, the system may determine that no historical data associated with the control is available in the one or more data stores of the system. In such an embodiment, the system may identify one or more controls and the consideration set of indicators indicative of effectiveness of control 'A' and may formulate a guiding question such as "Identify one or more indicators indicative of control 'A' from the list below." The system may present the guiding question(s) and a list of the potential indicators to the user. Upon receiving the user's selection of the indicators from, the system may extract data associated with the selected indicator(s) and may formulate additional guiding questions to determine other indicators potentially indicative of control 'A'.

As shown in block 225, the system displays the questionnaire via the control effectiveness application user interface. For example, the system may present the one or more guiding questions in the form a prompt via the control effectiveness application user interface.

As shown in block 230, the system receives at least one indicator associated with each of the one or more guiding questions in the questionnaire from the user device. For example, when the system displays one of the guiding questions and presents one or more options such as "high impact," "moderate impact," "low impact," (to control effectiveness) and/or the like, the user may select the option "high impact" and send it to the system. In some embodiments, the system may receive more than one indicator from the user. In alternate embodiments, the system may receive exactly one option from the user.

As shown in block 235, the system applies a regression algorithm on the consideration set of indicators, and in some cases, reduces the number of indicators for inclusion in a final equation. Regression may be applied and re-applied until a threshold number of indicators is evident. In other words, a predetermined number of indicators may be determined and the lower or no-correlation indicators after regression may be removed from the final equation. In some embodiments, a threshold level of correlation is determined and applied to the indicators after regression and those below the threshold correlation are removed from the final equation.

In some optional embodiments, as shown in block 240, the system determines one or more distribution models based on the final equation. The one or more distribution models may be any distribution models used in probability theory and statistics. In some embodiments, the one or more distribution models may be extreme loss models such as Gumbel distribution model, Frechet Distribution model, and/or the like. In various embodiments, the relationships between/among the indicators and the control effectiveness are complex, but in some cases the relationships may be linear or more simplistic.

Referring now to FIG. 2B, as shown in block 245, the system extracts historical data associated with the control from a historical database. The historical database may be part of the one or more data stores. Historical data may be any data associated with the controls and their effectiveness and relationship with the various indicators of the consideration set. For example, the historical data may be any data from a previous year. In some embodiments, historical data may be any data associated with the past events. In some embodiments, the historical data may be data generated by other entity systems. In some embodiments, the historical data may be financial data associated with the control and any exposures associated with the control. In an exemplary embodiment, wherein the exposure is data loss, the historical data may be related to the flow of data.

As shown in block 250, the system applies historical data to the one or more distribution models. In an exemplary embodiment, the system applies one month data from the previous year to the one or more distribution models and determines accuracy of the distribution models. For example, the system may apply March data from the previous year to predict the one or more events for the month of April. The system may then compare the predicted data for the month of April with the already existing April month data from the previous year to calculate accuracy of the one or more distribution models and check how well the one or more distribution models may have predicted the one or more past events had the system been using the one or more distribution models. In some embodiments, the system may calculate the accuracy of the one or more distribution models by utilizing twelve month data from the previous year. In some other embodiments, the system may calculate the accuracy of the one or more distribution models by utilizing more or less than twelve month data from any of the previous years.

As shown in block 255, the system calculates accuracy of the one or more distribution models based on applying the historical data to the one or more distribution models. For example, the system may determine that the Gumbel distribution model has predicted events associated with data loss ninety percent accurately and that the Frechet distribution model has predicted events associated with data loss ninety-nine percent accurately based on applying previous year data to the one or more distribution models. As shown in block 260, the system presents the accuracy of the one or more distribution models via the event prediction application user interface. In an exemplary embodiment, the system may recommend a suitable distribution model from the one or more distribution models based on the accuracy of the one or more distribution models. For example, the system may recommend Frechet distribution model as the most suitable distribution model for the exposure as it may have predicted past events associated with the data loss ninety-nine percent accurately had the system been using Frechet distribution model.

As shown in block 265, the system prompts the user to select at least one distribution model from the one or more distribution models via the event prediction application user interface. For example, the system may present accuracies of both the Frechet distribution model and the Gumbel distribution model and may display Frechet distribution model as the most suitable model. The system may then prompt the user to select any of the one or more distribution models. As shown in block 270, the system receives a second selection of the at least one distribution model from the user. In some embodiments, the at least one distribution model selected by the user is same as the most suitable model recommended by the system. In alternate embodiments, the at least one distribution model is different from the most suitable model recommended by the system. For example, the user may choose Gumbel distribution model instead of Frechet distribution model. In some embodiments, the indicator(s) selected by the user in block 230 may be a subcategory. In other words, the indicators selected by the user may be downstream. In such an embodiment, the system may utilize multiple distribution models in analyzing the indicators.

As shown in block 275, the system, in response to receiving the second selection of the at least one distribution model from the user, estimates the occurrence of the one or more events associated with the exposure using the at least one distribution model. The system estimates the occurrence of the one or more events by applying the most recent data to the at least one distribution model selected by the user. For example, the system may extract previous month data from the one or more data stores and may provide the extracted data as input to the at least one distribution model. The at least one distribution model may estimate that data loss may occur once next month based on the inputted data. In some embodiments, the system may generate one or more reports to document the estimated data, the at least one distribution model used in generating the estimated data, and/or the like.

In various embodiments of the invention, whether using modeling as discussed above or not, as shown in block 280, the system triggers one or more automated actions based on the final equation. The one or more automated actions may be configured to improve control effectiveness based on the variables having the highest expected impact on control effectiveness. In some embodiments, the system may require user approval before automatically implementing one or more changes to the system such as installation of operating systems to reduce the overall number of operating systems used across an organization. In various embodiments, such an automated remediation may include reprioritizing actions. For example, once a particular action has been taken, remaining actions may require reprioritization because the circumstances have changed and the remaining actions may have less, more or different levels of importance given the taking of the first action. In some embodiments, the system may continuously building upon the experience of the system so that it functions more effectively and possibly more efficiently in similar circumstances in the future.

In some embodiments, the system may trigger actions to automatically allocate resources to mitigate the impact of the events associated with an exposure. Resources may be any one of funds, software, people, and/or the like. In one embodiment, the system may assign a user to implement one or more steps to mitigate the impact of the event. In another embodiment, the system may allocate funds to mitigate the impact of the events. The present invention thereby predicts the occurrence of one or more events by performing exposure analysis to determine the type of exposure and suggesting one or more distribution models based on the type of the exposure rather than just relying on quantitative analysis of the past events. Therefore, the system may utilize the predicted data to improve the efficiency of the system by mitigating the impact of the one or more events.

Referring now to FIG. 3, a general process flow 300 is provided for verifying at a future time period, the accuracy of the at least one distribution model selected by the user. As shown in block 310, the system collects new data at a future time period. For example, if the system predicted data for the month of March at the beginning of the month, the system collects new data i.e., March month data at the end of the month. The new data may be event data associated with data loss exposure. As shown in block 320, the system compares the new data with estimated data associated with the occurrence of the one or more events.

As shown in block 330, the system calculates new accuracy of the at least one distribution model based on comparing the new data with the estimated data. For example, if the user has selected Gumbel distribution model for predicting events for the month of March, the system compares the March month data collected at the end of the month with the estimated data provided by the system using the Gumbel distribution model at the beginning of the month. In some embodiments, the system may input the new data into the at least one distribution model and may compare output with the estimated data.

As shown in block 340, the system displays the new accuracy to the user via the event prediction application user interface. For example, if the Gumbel distribution model predicted that the one event may occur in the month of March, the system determines the accuracy by verifying whether the event has occurred or not based on the comparison of the new data and the predicted data. If the event has occurred, the system determines that the Gumbel distribution model is hundred percent accurate and displays the accuracy to the user via the event prediction application user interface. In some embodiments, when the new accuracy is below a predetermined threshold, the system may automatically trigger one or more actions. For example, the system may determine one or more contacts associated with the exposure analysis and may send one or more alerts. Based on receiving the one or more alerts, the one or more contacts may take one or more measures. In some embodiments, when the new accuracy is below a predetermined threshold, the system may automatically suggest a new set of distribution models to the user and may prompt the user to repeat the exposure analysis. In some embodiments of the present invention, a feedback is given to the system based on the calculated new accuracy. The system may use this feedback to improve the suggestions of the one or more distribution models for different types of the exposure.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein. In some embodiments, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent application:

| Docket Number | U.S. patent application Ser. No. | Title | Filed On |
|---|---|---|---|
| 7824US1.014033.3058 | To be assigned | EVENT PREDICTION AND IMPACT MITIGATION SYSTEM | Concurrently herewith |

What is claimed is:

1. A system for indicator regression and modeling for implementing system changes to improve control effectiveness, the system comprising:
one or more memory devices having computer readable code stored thereon; and
one or more processing devices operatively coupled to the one or more memory devices, wherein the one or more processing devices are configured to execute the computer readable code to:
present a list of controls to a user, via a control effectiveness application user interface on a user device;
prompt the user to select a control from the list of controls, via the control effectiveness application user interface;

receive a selection of the control from the user device, via the control effectiveness application user interface;

receive two or more consideration indicators from the user device, via the control effectiveness application user interface, wherein the two or more consideration indicators form a consideration set of indicators;

apply a regression algorithm on the consideration set of indicators to determine, based on a predetermined threshold, a subset of the consideration set of indicators;

finalize a final equation that relates the subset of the consideration set of indicators with control effectiveness of the selected control;

in response to finalizing the final equation, (i) determine one or more distribution models based on the final equation, wherein the one or more distribution models estimate control effectiveness associated with the control, and (ii) automatically perform an action configured to improve effectiveness of the selected control based on the final equation;

prompt the user to select at least one distribution model from the determined one or more distribution models via the control effectiveness application user interface;

receive a second selection of the at least one distribution model from the user; and in response to receiving the second selection of the at least one distribution model from the user, estimate the effect on control effectiveness of modifying one or more of the indicators.

2. The system of claim 1, wherein the one or more processing devices are configured to:
in response to performing the action, re-apply the regression algorithm on the consideration set of indicators; and
finalize a second final equation that relates a second subset of the consideration set of indicators with control effectiveness of the selected control.

3. The system of claim 2, wherein the one or more processing devices are configured to:
in response to finalizing the second final equation, automatically perform a second action configured to improve control effectiveness of the selected control based on the second final equation.

4. The system of claim 2, wherein the one or more processing devices are configured to:
in response to finalizing the second final equation, determine that a second action is unnecessary to improve control effectiveness of the selected control.

5. The system of claim 4, wherein determining that a second action is unnecessary comprises determining the control effectiveness is above a control effectiveness threshold.

6. The system of claim 1, wherein the one or more processing devices are configured to:
extract historical data associated with the control from a historical database;
apply the historical data to the one or more distribution models;
calculate accuracy of the one or more distribution models based on applying the historical data to the one or more distribution models; and
present the accuracy of the one or more distribution models via the control effectiveness application user interface.

7. The system of claim 6, wherein presenting the accuracy of the one or more distribution models further comprises recommending a suitable distribution model from the one or more distribution models based on the accuracy of the one or more distribution models.

8. The system of claim 7, wherein the second selection of the at least one distribution model received from the user is same as the suitable distribution model.

9. The system of claim 1, wherein estimate the effect on control effectiveness of modifying one or more of the indicators using the at least one distribution model comprises applying current data to the at least one distribution model.

10. The system of claim 1, wherein the one or more processing devices are configured to:
in response to receiving the selection of the control, generate a questionnaire associated with the control, wherein the questionnaire comprises one or more guiding questions;
display the questionnaire via the control effectiveness application user interface; and
prompt the user to select at least one indicator forming the consideration set of indicators.

11. The system of claim 10, wherein the one or more processing device are configured to:
execute the computer readable code to generate the questionnaire by:
extracting information associated with the control from a data store, wherein the information comprises at least industry specific knowledge and security knowledge; and
formulating the one or more guiding questions based on the extracted information, wherein the one or more guiding questions are used to determine at least one of the consideration set of indicators.

12. The system of claim 1, wherein the one or more processing devices are configured to execute the computer readable code to:
collect new data at a future time period;
compare the new data with the estimation of the effect on control effectiveness of modifying one or more of the indicators;
calculate a new accuracy of the at least one distribution model based on the comparison; and
display the new accuracy to the user via the control effectiveness application user interface.

13. A computer program product for indicator regression and modeling for implementing system changes to improve control effectiveness, the computer program product comprising at least one non-transitory computer readable medium comprising computer readable instructions, the instructions comprising instructions for:
presenting a list of controls to a user, via a control effectiveness application user interface on a user device;
prompting the user to select a control from the list of controls, via the control effectiveness application user interface;
receiving a selection of the control from the user device, via the control effectiveness application user interface;
receiving two or more consideration indicators from the user device, via the control effectiveness application user interface, wherein the two or more consideration indicators form a consideration set of indicators;

applying a regression algorithm on the consideration set of indicators to determine, based on a predetermined threshold number of indicators, a subset of the consideration set of indicators;

finalizing a final equation that relates the subset of the consideration set of indicators with control effectiveness of the selected control;

in response to finalizing the final equation, (i) determining one or more distribution models based on the final equation, wherein the one or more distribution models estimate control effectiveness associated with the control, and (ii) automatically performing an action configured to improve effectiveness of the selected control based on the final equation;

prompting the user to select at least one distribution model from the determined one or more distribution models via the control effectiveness application user interface;

receiving a second selection of the at least one distribution model from the user; and in response to receiving the second selection of the at least one distribution model from the user, estimating the effect on control effectiveness of modifying one or more of the indicators.

14. The computer program product of claim 13, wherein the instruction further comprise instructions for:

in response to performing the action, re-applying the regression algorithm on the consideration set of indicators; and finalizing a second final equation that relates a second subset of the consideration set of indicators with control effectiveness of the selected control.

15. The computer program product of claim 14, wherein the instructions further comprise instructions for:

in response to finalizing the second final equation, automatically performing a second action configured to improve control effectiveness of the selected control based on the second final equation.

16. The computer program product of claim 14, wherein the instructions further comprise instructions for:

in response to finalizing the second final equation, determining that a second action is unnecessary to improve control effectiveness of the selected control.

17. The computer program product of claim 16, wherein determining that a second action is unnecessary comprises determining the control effectiveness is above a control effectiveness threshold.

18. A computer implemented method for indicator regression and modeling for implementing system changes to improve control effectiveness, the computer implemented method comprising:

presenting a list of controls to a user, via a control effectiveness application user interface on a user device;

prompting the user to select a control from the list of controls, via the control effectiveness application user interface;

receiving a selection of the control from the user device, via the control effectiveness application user interface;

receiving two or more consideration indicators from the user device, via the control effectiveness application user interface, wherein the two or more consideration indicators form a consideration set of indicators;

applying a regression algorithm on the consideration set of indicators to determine, based on a predetermined threshold number of indicators, a subset of the consideration set of indicators;

finalizing a final equation that relates the subset of the consideration set of indicators with control effectiveness of the selected control;

in response to finalizing the final equation, (i) determining one or more distribution models based on the final equation, wherein the one or more distribution models estimate control effectiveness associated with the control, and (ii) automatically performing an action configured to improve effectiveness of the selected control based on the final equation;

prompting the user to select at least one distribution model from the determined one or more distribution models via the control effectiveness application user interface;

receiving a second selection of the at least one distribution model from the user; and in response to receiving the second selection of the at least one distribution model from the user, estimating the effect on control effectiveness of modifying one or more of the indicators.

* * * * *